United States Patent [19]

DeMartino et al.

[11] Patent Number: 4,822,197
[45] Date of Patent: Apr. 18, 1989

[54] QUICK CONNECT/DISCONNECT ASSEMBLY

[76] Inventors: John D. DeMartino, 17 Bittersweet La., Wilbraham, Mass. 01095; Wayne J. Yee, 86 Monticello Ave., Springfield, Mass. 01109

[21] Appl. No.: 15,915

[22] Filed: Feb. 18, 1987

[51] Int. Cl.⁴ .............................................. F16B 19/00
[52] U.S. Cl. ................................... 403/154; 403/157; 411/340; 411/355
[58] Field of Search ............... 403/154, 155, 378, 379, 403/157; 411/351, 355, 340, 344, 345, 522

[56] References Cited

U.S. PATENT DOCUMENTS

| | | | |
|---|---|---|---|
| 325,221 | 8/1885 | Wright | 403/154 X |
| 1,402,566 | 1/1922 | Buhoup | 411/340 |
| 3,673,910 | 7/1972 | Collister | 411/345 |
| 4,167,772 | 9/1979 | Baehne | 411/340 X |
| 4,207,794 | 6/1980 | Collister | 411/340 |
| 4,508,479 | 4/1985 | Mez | 411/340 |

Primary Examiner—Andrew V. Kundrat
Assistant Examiner—Peter M. Cuomo
Attorney, Agent, or Firm—Ross, Ross & Flavin

[57] ABSTRACT

A quick connect/disconnect assembly includes a headed bifurcated primary member or post having a secondary or locking means releasably, slidably and swingably related thereto for movements between locked and unlocked positions.

1 Claim, 3 Drawing Sheets

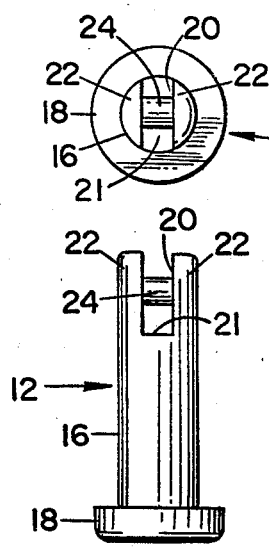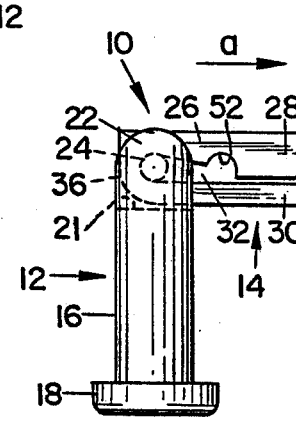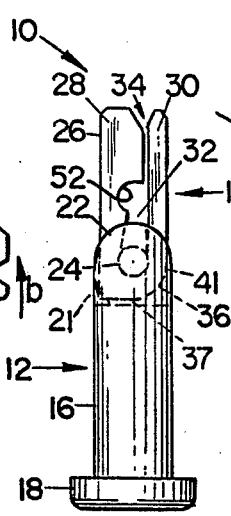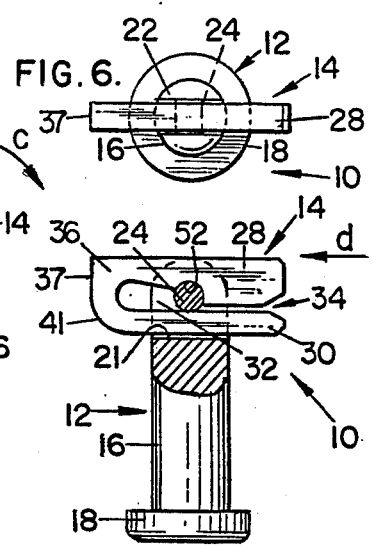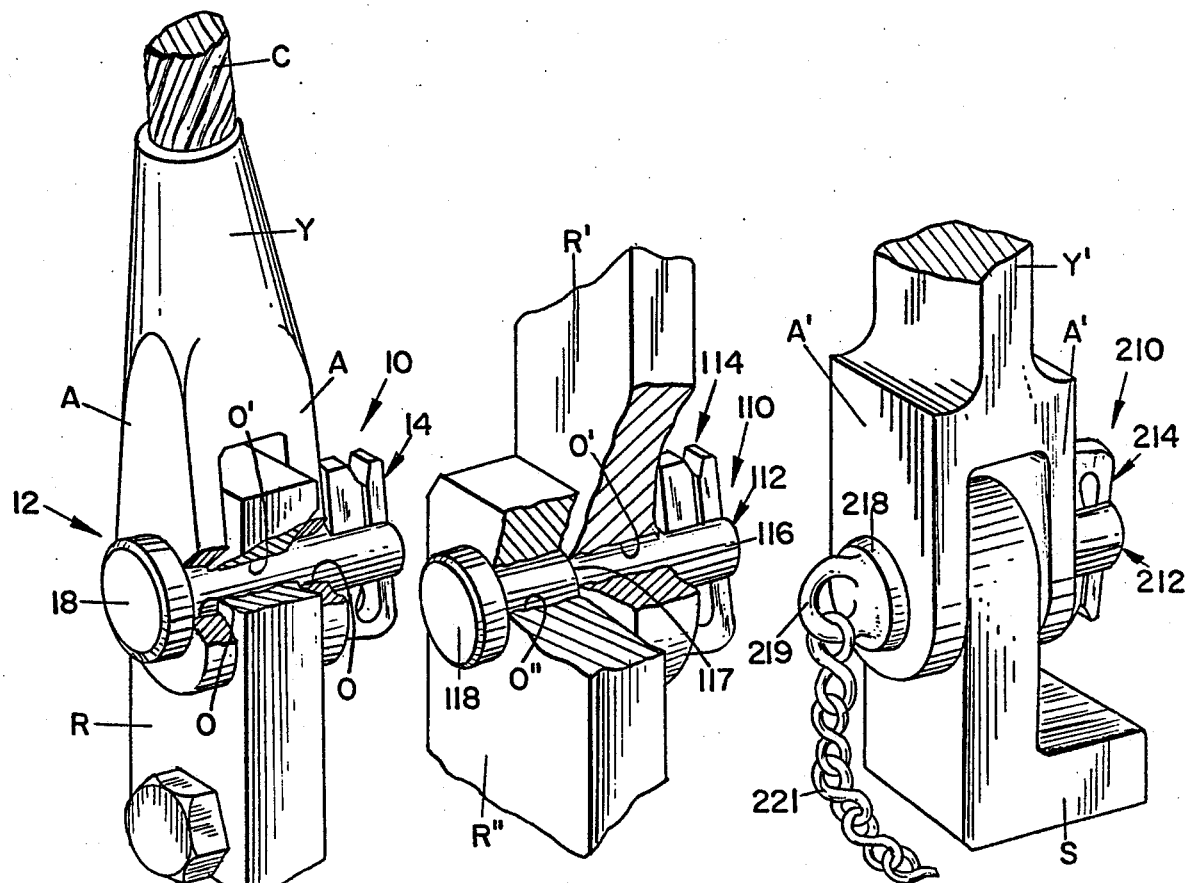

4,822,197

QUICK CONNECT/DISCONNECT ASSEMBLY

BACKGROUND OF THE INVENTION

1. Field of the Invention

The invention relates to fastening devices and more particularly to such devices which allow the assembly or disasembly of parts relative to each other.

2. Description of Related Art

A well known fastening device of the prior art is the clevis pin, which is used, for example, to connect such as a yoke and rod The clevis pin includes a head and a shank, with the shank passing through aligned openings in the yoke arms and the rod and being held in place by a cotter pin which passes through an opening in the shank, the head of the clevis pin bearing against one of. the yoke arms and the cotter pin bearing against the other of the yoke arms.

Such a fastener does not lend itself to the fast connection or disconnection of parts and cannot be operated by the fingers of one hand. Further, the cotter pin rusts when exposed to the elements and its sharp ends can cause injury if grasped, whereby it is usually taped to avoid injury.

Other fasteners of the prior art are expensive to manufacture, or complicated in their structure, or difficult to operate.

SUMMARY OF THE INVENTION

A primary object of the invention is to provide a quick connect/disconnect assembly which is inexpensive to manufacture and simple in its structure, and which may be quickly and easily operated with one hand without causing injury when it is grasped.

BRIEF DESCRIPTION OF THE DRAWING

FIG. 1 is a front elevational view of the primary member or post of a preferred form of the quick connect/disconnect assembly of the invention;

FIG. 2 is a top plan view thereof;

FIG. 3 a side elevational view of the primary member or post with the secondary member or locking means associated therewith, the locking means being shown in a first unlocked position;

FIG. 4 is a view similar to FIG. 3 showing the locking means in a second unlocked position;

FIG. 5 is a view similar to FIG. 3 showing the locking means in a locked position, with portions of the post broken away for clarity;

FIG. 6 is a top plan view of FIG. 6;

FIG. 7 is a front perspective view showing one manner of use of the quick connect/disconnect assembly of FIGS. 1-6, with parts broken away for clarity;

FIG. 8 is a front perspective view of a first modified form of quick connect/disconnect assembly and showing another mode of use thereof, with parts broken away for clarity;

FIG. 9 is a front perspective view of a second modified form of quick connect/disconnect assembly and showing another mode of use thereof, with parts broken away for clarity;

DESCRIPTION OF THE PREFERRED EMBODIMENTS

Figure 10:
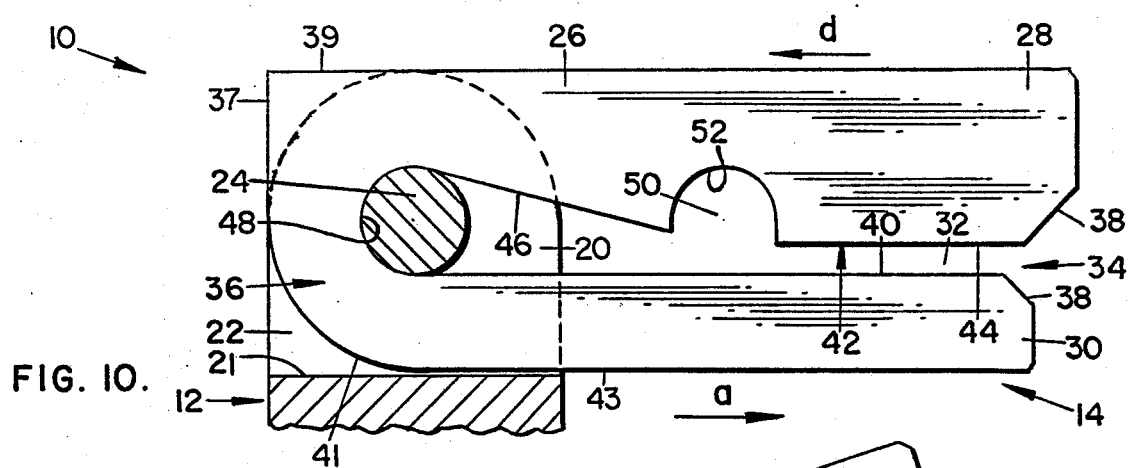
FIGS. 10-13 are enlarged, fragmentary, side elevational views of the FIGS. 1-6 embodiment graphically illustrating the relationship between the post and locking means as the locking means is moved in a substantially horizontal plane relative to the post between unlocked and locked positions.
Figure 11:
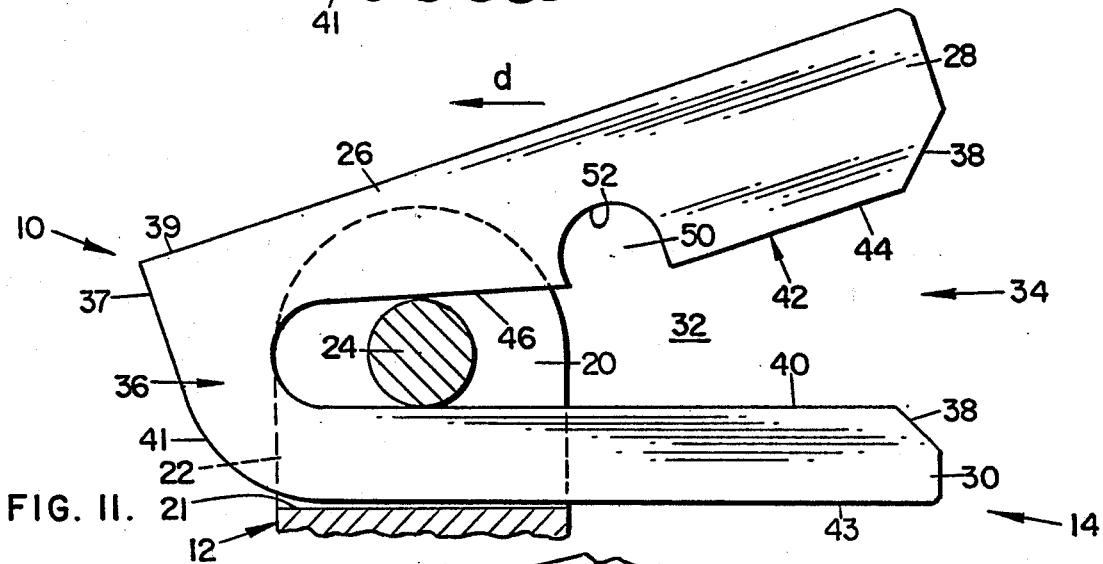
Figure 12:
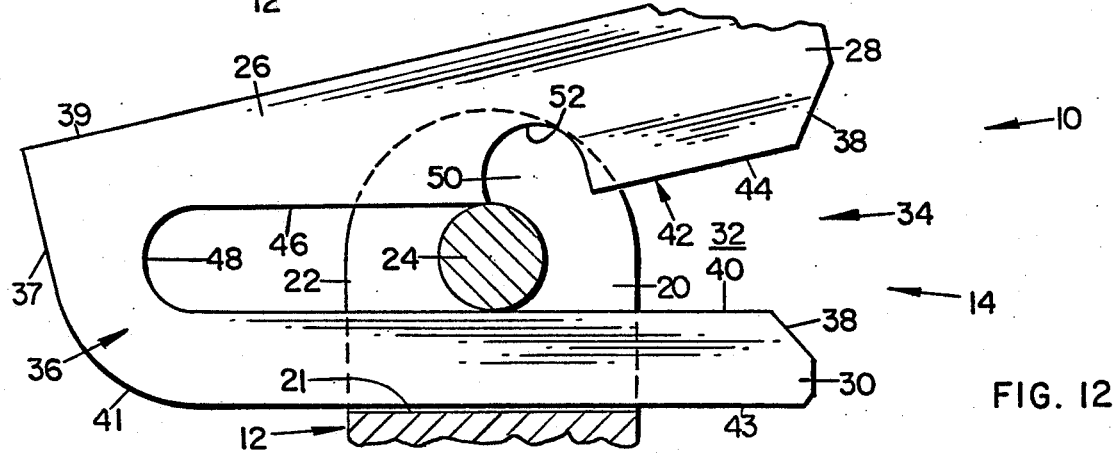
Figure 13:
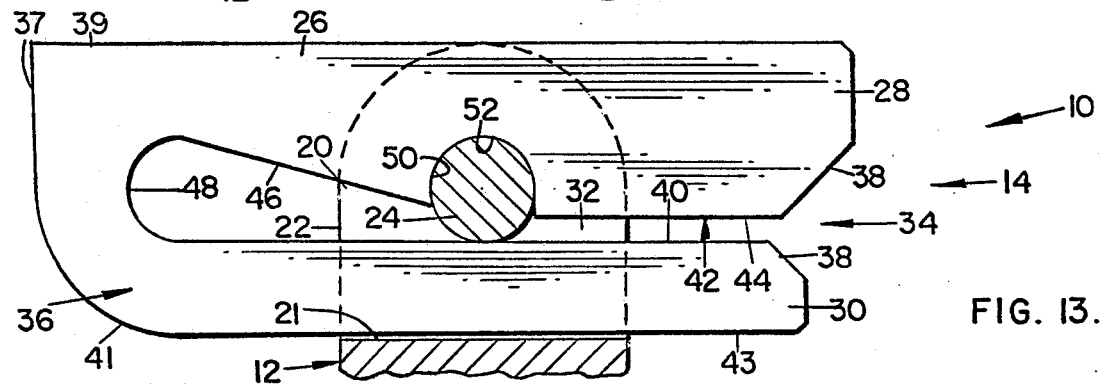

The quick connect/disconnect assembly of the preferred embodiment of FIGS. 1-6 is generally indicated by 10 and includes a primary member or post 12 having a secondary member or locking means 14 releasably, slidably and swingably related thereto for movements between locked and unlocked positions.

Primary member or post 12 and secondary member or locking means 14 are preferably formed from a strong, rigid metal or plastic, although one member may be metal and the other plastic, if desired.

Primary member or post 12 includes an elongated cylindrical body or shank 16 having an integral annular head 18 at one end and a recess 20 extending inwardly from its opposite end and terminating in a lower wall 21. The recess defines a bifurcation having a pair of spaced parallel legs 22, with a pin 24 bridging the bifurcation and extending transversely between and centrally of the legs.

Secondary member or locking means 14 includes an elongated flat body 26 having a pair of spaced, resilient upper and lower jaws 28 and 30 respectively, separated by a pin accommodating slot 32 which extends inwardly into the body from a mouth 34 at one end and terminates adjacent the opposite end in a closed pin-accommodating end 36.

As best seen in FIGS. 10-13, mouth 34 is defined by beveled edges 38 at the outboard ends of jaws 28 and 30 and communicates with pin-accommodating slot 32

Slot 32 is defined by a flat horizontally extending upper wall 40 of lower jaw 30 and a lower wall 42 of upper jaw 28.

Lower wall 42 of upper jaw 28 has a first horizontally-disposed outboard portion 44 disposed in spaced parallelism to upper wall 40 of lower jaw 30 and a second inboard portion 46 which is inclined relative to upper wall 40 and curves at its inboard end to form an inner radius 48 which in turn merges with the inner end of lower jaw upper wall 40. Radius 48 actually defines the inner wall of pin-accommodating end 36.

A pin-receiving recess 50 extends inwardly into upper jaw 28 from the jaw lower wall 42 and is disposed normal thereto and approximately centrally thereof between the outboard and inboard wall portions 44 and 46 respectively of the lower wall. Recess 50 has an arcuate inner terminus 52.

Inner radius 48 of pin-accommodating end 36 and terminus 52 of pin-receiving recess 50 are of appropriate size to snugly embrace pin 24 of post 12, as will appear.

The width of pin-accommodating slot 32 between jaws 28 and 30 inwardly or rearwardly of pin-receiving recess 50 and adjacent the forward end of inclined wall portion 46 is greater than the width of the slot 32 outwardly or forwardly of recess 50, for purposes to appear.

The outer wall of pin-accommodating end 36 of secondary member or locking means 14 has a flat upper wall portion 37 which is disposed normal to and merges with a top wall 39 of upper jaw 28, and an arcuate lower wall portion 41 which extends downwardly from flat wall portion 37 and merges with a lower wall 43 of lower jaw 30.

With reference to FIGS. 3-10 and 14 and 15, the member of interengagement between locking means 14 and post 12 will now be explained.

Locking means 14 is grasped by the fingers at pin-accommodating end 36 and the bevelled ends 38 of jaws 28 and 30 thereof are introduced into bifurcation 20 of post 12, with the mouth 34 of the locking means being disposed adjacent pin 24 of the post.

An inward horizontal pressure is exerted on the locking means, causing the bevels 38 of jaws 28 and 30 to contact pin 24 to deflect the jaws away from each other and to widen pin-accommodating slot 32 permitting locking means 14 to be slid substantially horizontally inwardly relative to post 12 in the direction of arrow a in FIG. 3, with the walls of the jaws riding along relative to the pin until the locking means reaches the position shown in FIGS. 3 and 10, wherein pin 24 is seated in pin accommodating end 36 and bears against arcuate radius 48.

Figure 14:
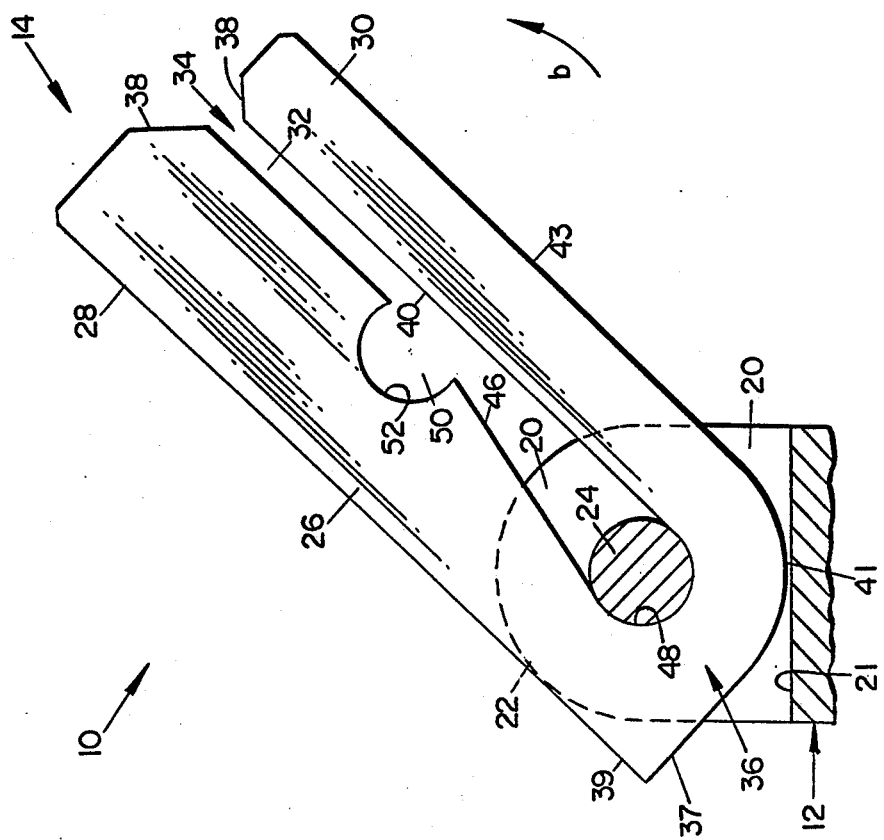

The free outer end of locking means 14 is next swung upwardly or counter-clockwise in the direction of the arrow b as shown in FIGS. 3 and 14, pivoting relative to pin 24, such pivoting being possible since the arcuate lower wall portion 41 of pin-accommodating end 36 of the locking means clears lower wall 21 of recess 20 of post 12.

Figure 15:
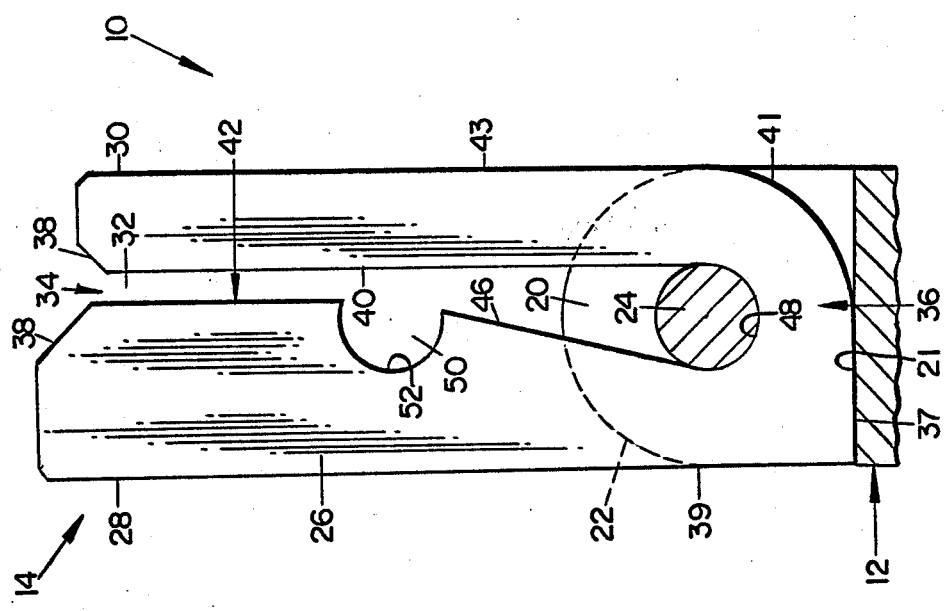
FIGS. 14 and 15 are enlarged, fragmentary, side elevational views of the FIGS. 1-6 embodiment graphically illustrating the relationship between the post and locking means as the locking means is moved in a swinging manner relative to the post between a horizontal unlocked position and a vertical unlocked position.

Such upward swinging movement of locking means 14 is continued until the locking means reaches the position of FIGS. 4 and 15, wherein it is in substantial axial alignment with the vertical axis of shank 16 of post 12.

In this position, flat wall portion 37 of pin-accommodating end 36 bears against wall 21 of recess 20 of post 12 and acts as a stop to effectively block further upward or counter-clockwise swinging movement of the locking means relative to the post.

Such blocking action is essential since the locking means 14 and post 12 must be maintained in axial alignment to permit easy insertion of quick connect/disconnect assembly 10 through the aligned openings of parts to be pivotally joined together, such as the yoke Y and rod R of FIG. 7, or the rods R' and R" of FIG. 8, or the yoke Y' and support S of FIG. 9.

Following insertion of assembly 10 through the aligned openings of the parts to be joined together, the outer free end of locking means 14 is now swung downwardly or clockwise in the direction of the arrow C in FIG. 4 back to the position of FIGS. 3 and 10, such swinging movement being possible because of the clearance provided by arcuate lower wall portion 41 of locking means 14.

As best seen in FIGS. 10-13, locking means 14 is now slid substantially horizontally in the direction of arrow d relative to pin 24, with the jaws 28 and 30 being deflected apart as pin 24 rides along inclined inboard portion 46 of lower wall 42 of upper jaw 28. Such sliding movement of locking means 14 continues until pin 24 clears inclined inboard portion 46 at which time the tension on the jaws is released and jaw 28 springs back to its substantially horizontal orientation and pin 24 is seated in pin-receiving recess 50 of the locking means to preclude further sliding movement of the locking means relative to the post. The assembly is now in a locked position, wherein it becomes a T-head crosspiece.

To unlock the assembly, the user need only insert a thumb into the mouth 34 between jaws 28 and 30 and separate the jaws to lift recess 50 of upper jaw 28 out of engagement with pin 24 of post 12 permitting sliding horizontal movement of the locking means in the opposite direction, i.e. in the direction of arrow a, with pin 24 riding relative to pin-accommodating slot 32 of the locking means, this being possible because of the deflection apart of jaws 28 and 30 assisted by the greater width of slot 32 rearwardly of recess 50.

All of these movements of the locking means between locked and unlocked positions may be quickly and easily accomplished with the fingers of one hand, an important feature when rapid speed of assembly or disassembly of parts relative to each other is essential.

FIG. 7 shows the quick connect/disconnect assembly 10 of the FIGS. 1-6 and FIGS. 10-15 embodiment in association with a yoke Y and a rod R the yoke having a bifurcated lower end defining a pair of arms A and being fixed at its opposite end to a cable C, the quick connect/disconnect assembly passing through aligned openings 0 and in the arms A of the yoke and an opening O' in the upper end of rod R disposed between the yoke arms, with locking means 14 being shown in locked position and bearing against the outer face of the adjacent yoke arm A, and the head 18 of post 12 bearing against the outer face of the other yoke arm to effectively link yoke Y and rod R together while permitting pivotal movement of one relative to the other.

FIG. 8 shows a first modified form of quick connect/disconnect assembly 110, similar in construction to that of the preferred embodiment and differing therefrom only in that the shank 116 of post 112 is stepped at 117 to provide the shank with different diameters to accommodate the different diameter opening O' in rod R' and opening O" in rod R" aligned therewith.

Post 112 includes a head 118 and locking means 114 identical to those of the preferred embodiment, with the locking means being shown in locked position and bearing against the outer face of adjacent rod R', and the head 118 bearing against the outer face of adjacent rod R' to effectively link the rods together while permitting pivotal movement of one relative to the other.

FIG. 9 shows a second modified form of quick connect/disconnect assembly 210, similar in construction to that of the preferred embodiment and differing therefrom only in that the head 218 is provided with an integral loop 219 having a chain 221 fixed thereto whereby the quick connect/disconnect assembly can be secured against loss.

Assembly 210 is shown in association with a yoke Y' and a support S, the yoke having a bifurcated lower end defining a pair of arms A', the quick connect/disconnect assembly passing through aligned openings, not shown, in the arms A' and in the support, also not shown, with the support being disposed between the yoke arms. Herein, locking means 214 is shown in locked position and bearing against the outer face of the adjacent yoke arm A', and the head 218 of post 212 is shown as bearing against the outer face of the other yoke arm to effectively link yoke Y' and support S together while permitting pivotal movement of the yoke relative to the support.

As previously stated, the quick connect/disconnect assembly, in all of its embodiments, may be easily operated with the fingers of one hand when it is desired to connect parts together or to disconnect parts from each other, thus freeing the other hand for other tasks.

We claim:

1. A two-part fastener for interjoining first and second workpieces having a pair of aligned openings transversely extending therethrough comprising:

an elongated primary post having opposite outboard and inboard extremities with an enlarged head at the inboard extremity and a bifurcated head at the outboard extremity defining a pair of spaced legs, a pivot pin connected to each of the spaced legs of the primary post extending between and transversely of the legs in bridging relationship with the bifurcation at its approximate midsection.

an elongated secondary post having opposite outboard and inboard extremities and defined by a pair of first and second resilient jaws interjoined at the inboard extremity and having respective first and second confronting faces separated by an expandable pin-accommodating slot extending inwardly from the outboard extremity, an inner radius defining a slot bottom in the area of the joinder of the jaws, a transversely-extending pivot pin-receiving recess extending inwardly from the first confronting face of the first jaw at the approximate midsection of the pin-accommodating slot, the first confronting face of the first jaw extending in substantial parallelism with the second confronting face of the second jaw from the outboard extremity of the secondary post to the pivot pin-receiving recess and extending at an acute angle relative to the second confronting face of the second jaw from the pivot pin-receiving recess to the slot bottom in defining an inner ever-widening wedge-shaped throat portion of the pin-accommodating slot, the secondary post being primarily positionable relative to the primary post between a first preparatory mode upon insertion of the secondary post along a first axis through the bifurcation of the primary post for seating the pivot pin of the primary post in abutment with the slot bottom of the secondary post and a second preparatory mode upon rotation of the secondary post relative to the pivot pin of the primary post for bringing the primary and secondary posts into coaxial-alignment, the coaxially-aligned primary and secondary posts being insertable through the aligned openings of the first and second workpieces with the enlarged head of the inboard extremity of the primary post abutting the first workpiece and with the outboard extremity of the primary post projecting outboard of the second workpiece, the secondary post being secondarily positionable relative to the primary post between a first operating mode upon pivot of the secondary post along a second axis right angular to the first axis and a second operating mode upon the sliding of the secondary post relative to the primary post with the contact of the pivot pin by the first and second confronting faces of the first and second jaws in the area of the wedge-shaped throat of the pin-accommodating slot camming the jaws into a spreading relationship for allowing seating of the pivot pin in the pin-receiving recess for function as a T head crosspiece in locking the primary and secondary posts against withdrawal relative to the workpieces.

* * * * *